United States Patent [19]
Laul

[11] Patent Number: 5,966,986
[45] Date of Patent: Oct. 19, 1999

[54] PROPULSION SYSTEM

[76] Inventor: Virgil Rickard Laul, 6 Terra Vista, Dana Point, Calif. 92629-3121

[21] Appl. No.: 08/999,080

[22] Filed: Dec. 29, 1997

[51] Int. Cl.$^6$ .................................................. F16H 33/20
[52] U.S. Cl. ........................... 74/84 R; 74/84 S; 244/172
[58] Field of Search ........................... 74/61, 84 R, 84 S; 180/7.1; 244/172

[56] References Cited

U.S. PATENT DOCUMENTS

| | | | |
|---|---|---|---|
| 2,886,976 | 5/1959 | Dean | 74/112 |
| 3,266,233 | 8/1966 | Farrall | 180/7.1 X |
| 3,530,617 | 9/1970 | Halvorson et al. | 46/243 |
| 4,242,918 | 1/1981 | Srogi | 74/84 S |
| 5,831,354 | 11/1998 | Stopplecamp | 244/172 X |

*Primary Examiner*—Allan D. Herrmann
*Attorney, Agent, or Firm*—Albert O. Cota

[57] ABSTRACT

A propulsion system (10) which is designed to be used on a payload platform (90) such as a spacecraft, satellite, aircraft or an ocean vessel. To operate the system (10) electrical power is required. However, during operation the system (10) does not require fuel or other mass be expelled into the environment to move in space. The system (10) is designed to operate in two operational modes: in Mode I the system (10) incrementally moves the payload platform (90) forward with each operational cycle. In this first mode, the velocity imparted to the payload platform (90) is not additive. In Mode II the payload platform (90) accelerates forward a discrete increment of velocity during each operational cycle. In this second mode the increments of velocity are additive.

21 Claims, 7 Drawing Sheets

PROPULSION SYSTEM

TECHNICAL FIELD

This invention pertains to systems that produce motion and that couple this motion to a structure that is propelled along a desired direction. The direction can be forward or backward, depending on the direction of rotation of the system's internal components.

BACKGROUND ART

Airplanes, spacecraft and motorized boats all expel material away from themselves in order to travel forward. In the case of a boat, water is forced backward, and, in the case of an airplane, air is pushed backwards. This is also true of spacecraft and satellites that travel outside the atmosphere. A major problem is that a spacecraft can only carry a limited amount of fuel with which to accelerate and change direction. This invention addresses this problem. No material is expelled in the opposite direction of travel of the system. A source of power is required to operate the new propulsion system, but the new system does not violate Newton's Laws or the Conservation of Linear Momentum. It has been wrongly assumed that such a system could not be built without violating either of the above laws. Although the above laws cannot be violated, the proper conditions can be set up within the system to utilize these laws to accomplish the function of the invention: which is to move forward or backward in space, water, air or on the ground without expelling any matter to the outside environment other than heat. The system has been reduced to practice and functions as described infra and additionally, the system fits a mathematical model for this type of operation.

A search of the prior art did not disclose any patents that read directly on the claims of the instant invention. However, the following U.S. patents are considered related:

| PAT. NO. | INVENTOR | ISSUED |
| --- | --- | --- |
| 4,242,072 | Srogi | January 06, 1981 |
| 4,614,319 | Drexler | September 30, 1986 |
| 3,868,072 | Fogarty | February 25, 1975 |
| 3,530,617 | Halvorson, et al | September 29, 1970 |
| 3,604,868 | Engelberger | April 7, 1970 |
| 3,322,374 | King, Jr. | May 30, 1967 |
| 3,266,233 | Farrall | August 16, 1966 |
| 2,886,976 | Dean | May 19, 1959 |

DISCLOSURE OF THE INVENTION

The system is based on the principle that vibrating or eccentric motion is produced when an unbalanced weight is rotated. The motion which causes the system to wobble about its center of mass would also cause the system to traverse a circular motion when in space. In space, two such systems are mounted on a carriage plate and are rotated in synchrony by a motor with the weights rotating in opposite directions. The weights cause the carriage plate to reciprocate back and forth.

The carriage plate, which holds the rotating weights is mounted on sliding linear bearings that are mounted on a base. When the motor on the carriage plate is turned on, the carriage plate moves back and forth on the sliding linear bearings. The distance of this back and forth motion is determined by the weight of the rotating masses, their distance from their axes of rotation, the weight of the carriage and any structure mounted on the carriage, such as the drive motor. In order to move forward in space a difference in the distance of travel of the weights must be established in their back and forth motion on the carriage slide as they rotate about their axes. This difference in distance that the weights move back and forth on the linear slide during each complete rotation of the weights allows the system to move forward a small amount during each of the system's operational cycle, thus any payload platform to which the system is mounted to will move forward or backward during each cycle. Initially the system begins with no motion forward, which is also defined as having zero momentum. After the system moves in space it is again completely stopped in space with zero net momentum.

The key to the operation of the system is the unequal displacement of the weights as they move back and forth on the linear slide on which the system is mounted. The back and forth motion of the carriage results from two counter-rotating weights that rotate in opposite directions in synchrony. When the weights travel from 0–90 degrees the carriage moves in the opposite direction. When the weights travel from 90–180 degrees, the base and carriage move forward. When the weights travel from 180–360 degrees, the carriage moves back to its original position. The base is not affected by this reciprocating motion other than experiencing a slight frictional drag resulting from the roller slide, which is always coupled when the carriage is in motion. During the system's reset cycle, from 180–360 degrees, friction on the linear slide assembly is the only coupling mechanism to the base by the carriage and weights.

Added to the system is a mechanism that establishes a difference in the resultant travel of the weights as they rotate on the carriage as the carriage is moving back and forth on the slide. This is done in the following manner: a guide plate is mounted above the slide which carries the carriage and the counter-rotating weights. When the weights rotate to the 0 degree position, they enter into a guide channel at 90 degrees from the direction of the back and forth motion of the carriage. The drive motor on the carriage now forces the weights to travel in a straight line 90 degrees to the desired direction of travel. The carriage however is still traveling forward on the slide until it hits a forward stop and a damper. The carriage, which is now in contact with the forward stop, pushes the base forward as the weights exit the guide channel and continue to rotate backwards in relation to the forward stop.

The key to the successful operation of this system is the ratio of the weight of the carriage and drive motor to the weight of the rotating masses. When the weights are in the guide channel their mass and the weight of the base or spacecraft constitute a first mass. The carriage is the second mass. When the two weights are in the guide channel, the base will move slightly backwards between 0–90 degrees, while pulling the carriage forward. When the weights reach the 90 degree mark, the carriage simultaneously impinges the carriage damper and the front stop, which is coupled to the base. The weights now exit the guide channel at 90 degrees. From 90–180 degrees, the weights are out of the guide channels and now rotate backwards 90–180 degree in relation to the base and carriage. Since the carriage is against the front stop, the opposite motion of the weights pushes the carriage and the base or platform forward. The weights continue to rotate 180–360 degrees causing the carriage to lift off the front stop at 180 degrees and thus decouple from the base. When the weights rotate to their initial position at 0 degrees the entire cycle is repeated. When each cycle is repeated the base (spacecraft) is pushed forward a fixed distance and then stops. Each cycle or 360 degree rotation of the weights adds another increment of distance traveled forward, after which all forward motion stops.

The system starts with zero forward momentum when the weights are at 0 degrees and are about to enter the guide slots. At the 180 degree position of the weights the whole system stops, in other words, the system has no net forward momentum. From 180–360 degrees, the carriage and weights are decoupled from the base, except for a slight frictional drag on the base through the slide. Thus, during this phase of operation of the system the carriage and weights constitute an independent system that returns to its initial condition and location and the whole cycle is repeated with an additional increment of forward travel. The center of mass of the whole system changes during the operation of the system as a result of different elements interacting in a dynamic continuous manner.

In order for the system to provide motion, in other than a forward direction, the system can be rotated in relation to the payload which was moving forward. The direction of action could also be changed by changing the direction of rotation of the weights and repositioning the guide channels.

The operation of the propulsion system is described by considering the ratio of the weight of the three elements that comprise the system, namely, the weights, the carriage and the base, and the interaction of their weights at different points of their rotation and the change of the center of mass of the interacting elements. At 0–90 degrees the weights are in the guide slots and their mass is combined with the mass of the base as they are rotated by the motor. The carriage constitutes the other mass as it travels forward. The base and weights move slightly rearward as the carriage moves forward.

Between 90–180 degrees, the carriage is in contact with the base and the drive motor pushes the weights backwards. This action causes the base and carriage to travel forward a greater distance than the reverse motion of the base from 0–90 degrees. At 180 degrees the weights reverse direction (in the linear sense not rotation) thus causing the carriage to decouple and lift off from the front stop. During the 180–360 degree cycle, the carriage and weights are effectively decoupled from the base. When the weights reach 360 degrees, they are again at their initial start point and the cycle repeats.

The center of mass of the system is changed during operation or rotation of the weights. The change in the center of mass from 0–90 degrees results in the whole system moving slightly backwards. From 90–180 degrees, the ratio of the moving masses and the center of mass changes again. At 180 degrees the momentum of the system is zero because the base and the momentum of the carriage is cancelled when the weights reach 180 degrees by their equal and opposite momentums because the base and carriage are locked together from 90–180 degrees. At this point the carriage and weights are decoupled from the base, and each has its own dynamic center of mass. When the weights reach 360 degrees they are re-coupled to the base and the system's operational cycle is repeated.

BEST MODE FOR CARRYING OUT THE INVENTION

Figure 1:
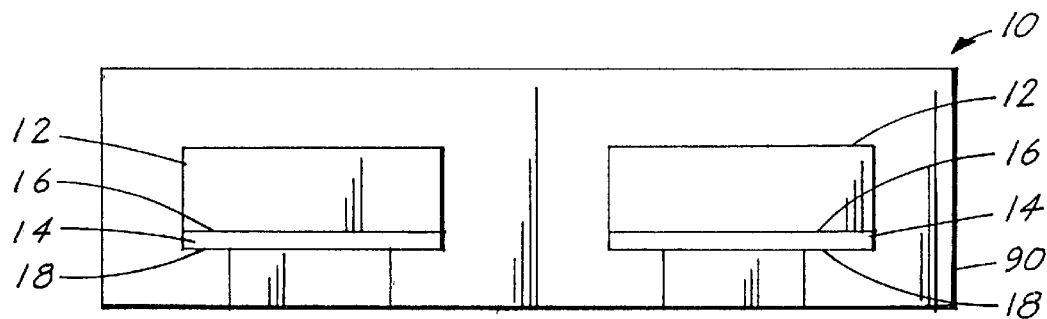
FIG. 1 is a side elevational view of the propulsion system mounted within a payload platform.

The best mode for carrying out the invention is presented in terms of a preferred embodiment which is described in two operational modes: a Mode I and a Mode II. In each of these modes a propulsion unit controls the attitude and/or propulsion of a payload platform. The preferred embodiment, as shown in FIGS. 1–22 is comprised of two major elements: a propulsion unit 12 and a payload platform 90 as shown in FIG. 1. The propulsion unit 12 is further comprised of the following major elements: a base 14, a carriage constraining assembly 20, a carriage 30, a pair of counterbalanced weights 42, a motor 40, a power source 46 and a weight guiding means 56.

Figure 2:
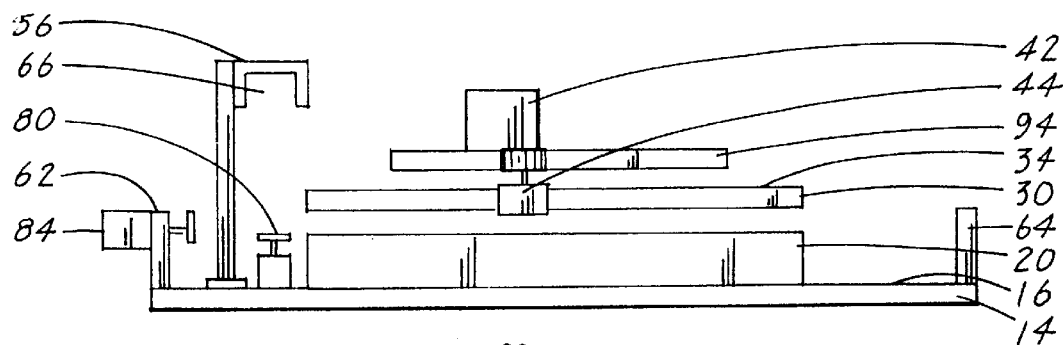
FIG. 2 is a side elevational view of the propulsion unit.
Figure 3:
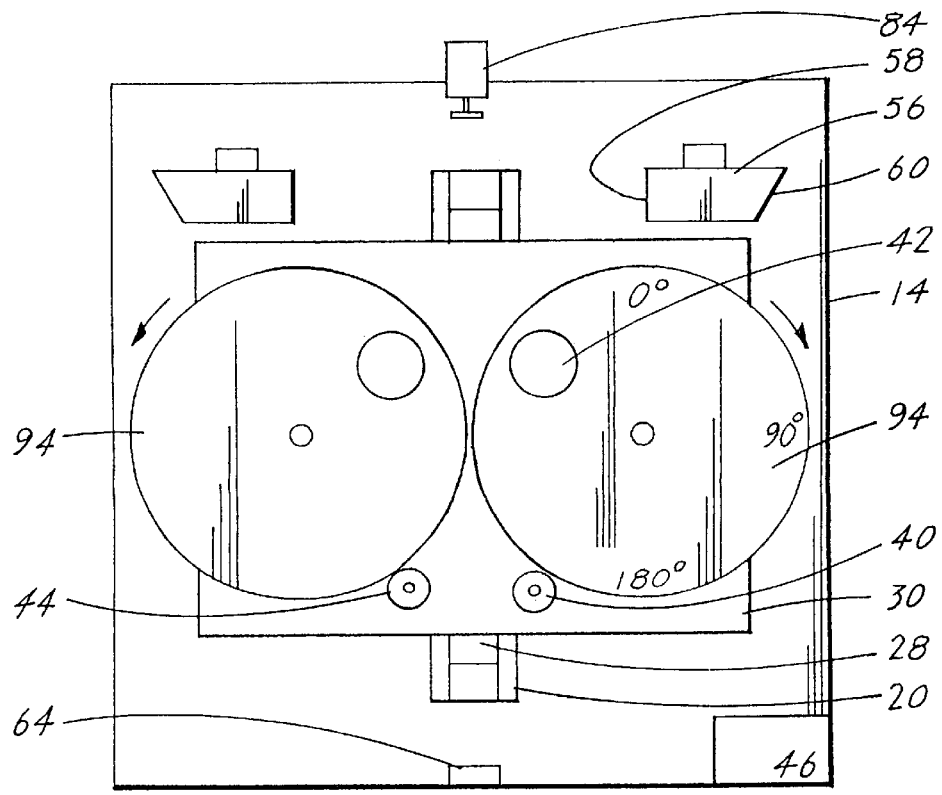
FIG. 3 is a top plan view of FIG. 2.
Figure 4:
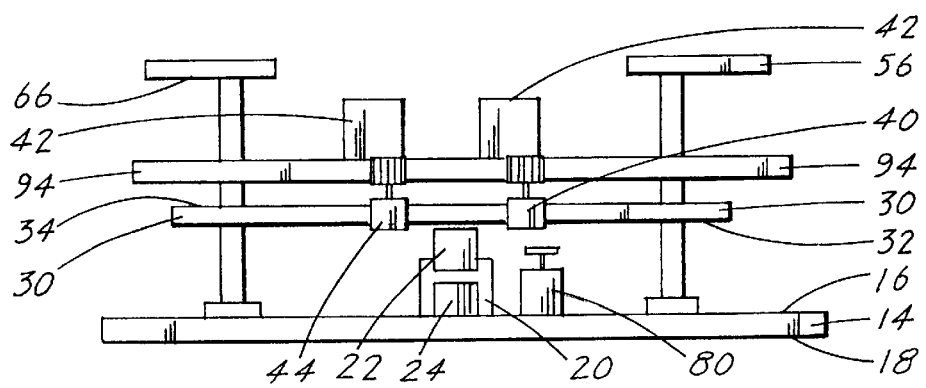
FIG. 4 is an elevational end view of FIG. 2.
Figure 5:
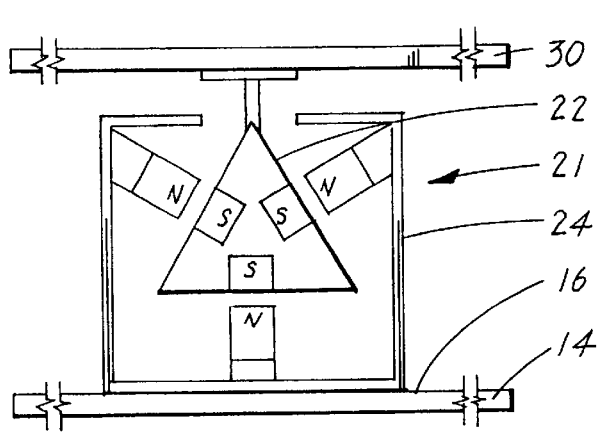
FIG. 5 is an end view of a magnetically levitating constraining assembly.

The base 14, as shown in FIGS. 2, 3 and 4, consists of an upper surface 16 and a lower surface 18. The lower surface of the base 14 is designed to be rigidly attached to the payload platform 90. The carriage constraining assembly 20 includes an upper movable section 22 and a lower stationary section 24. The lower stationary section 24 is rigidly attached to the upper surface 16 of the base 14 as also shown in FIGS. 2, 3 and 4. The carriage constraining assembly 20 can consist of a linear slide assembly 28, as shown in FIGS. 2, 3 and 4, or a magnetically levitating constraining assembly 21 as shown in FIG. 5. The linear slide assembly 28 also includes an upper movable section 22 and a lower stationary section 24.

Figure 14:
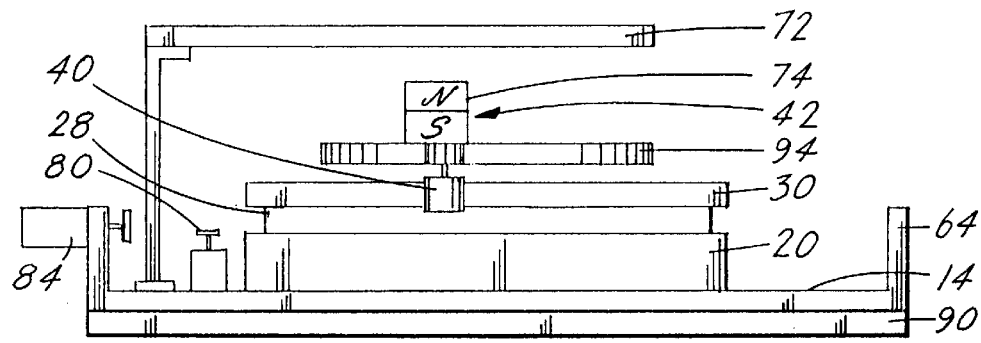
FIG. 14 is a side elevational view of the eddy current weight guiding means.
Figure 15:
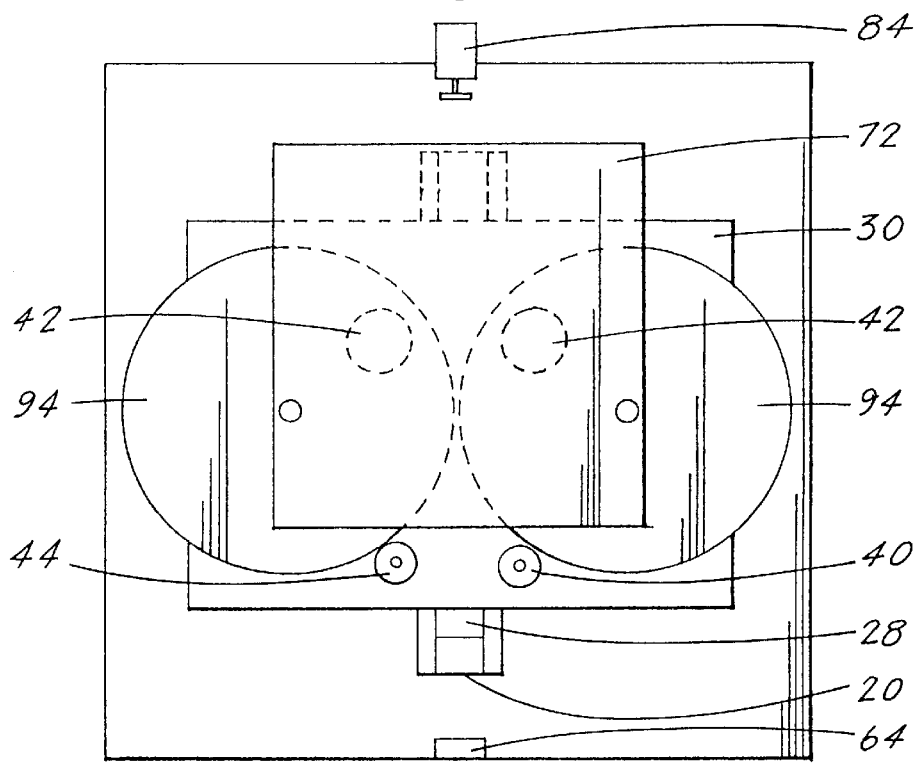
FIG. 15 is a top plan view of FIG. 14.
Figure 16:
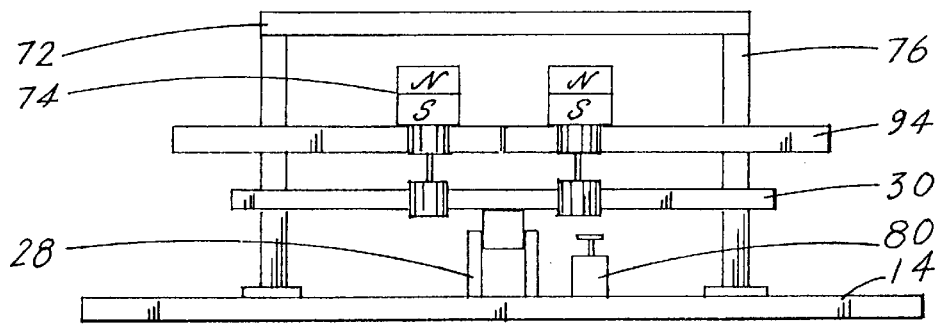
FIG. 16 is an end view of FIG. 14.

To the upper movable section 22 of the carriage constraining assembly 20 is attached the lower surface 32 of the carriage 30, which also has an upper surface 34, a front end 36 and a rear end 38. Attached by an attachment means to the upper surface 34 of the carriage 30 are the two counterbalanced weights 42 as shown in FIGS. 2, 3 and 4. These weights are made of a high-density material having a specific gravity of at least 0.5 Gm/Cm$^3$. The weights 42 are rotated in synchrony, either in a clockwise or counterclockwise direction by at least one electric motor 40, as shown in FIGS. 2, 3 and 4. The direction of rotation is dependent upon the location of the weight guiding means 56 and the desired direction of travel of the propulsion unit 12. If a conductive plate 72, as shown in FIGS. 14, 15 and 16, is used to change the path length of the weights 42, the direction of rotation for maximum efficiency is to rotate the weights into the outer edge of the conductive plate 72.

In one design configuration the means for attaching at least two of the counterbalanced weights 42 to the gears 94 and then to the upper surface 34 of the carriage 30 is accomplished as shown in FIGS. 2, 3 and 4 by attaching the motor 40 and a second motor 44 to the upper surface 34 of the carriage 30. Gears 94 keep the weights in a proper relationship to each other. The two motors 40 and 44 are synchronized to rotate in opposite directions, which allow the pair of weights 42 to maintain a relationship which cancels their lateral forces.

Figure 6:
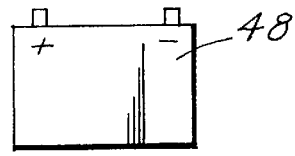
FIG. 6 is a block diagram of a rechargeable battery.
Figure 7:
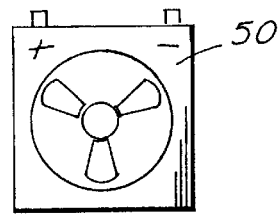
FIG. 7 is a block diagram of a nuclear battery.
Figure 8:
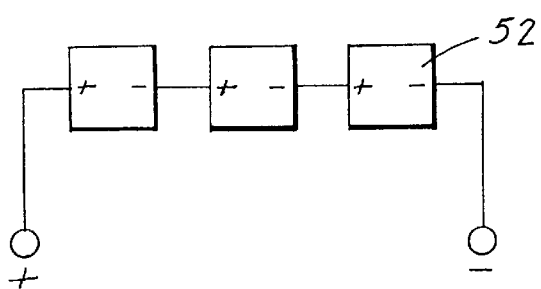
FIG. 8 is a block diagram of a plurality of photovoltaic cells.
Figure 9:
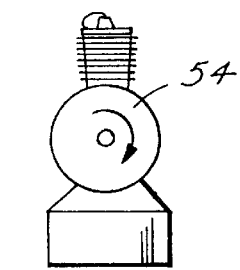
FIG. 9 is a schematic diagram of an internal combustion engine.

In whichever design configuration is utilized, the motors 40 and 44 are operated by the power source 46. This power source may consist of a rechargeable battery 48, as shown in FIG. 6, a nuclear battery 50, as shown in FIG. 7, an array of photovoltaic cells 52 as shown in FIG. 8 or a combination of the above power sources or a fuel-burning combustion engine 54 as shown in FIG. 9.

Figure 20:
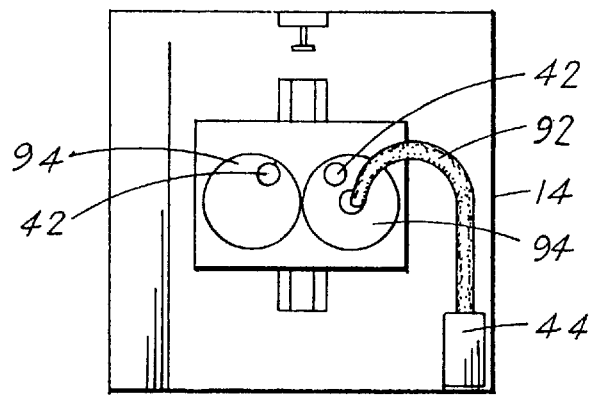
FIG. 20 is a schematic diagram of a weight driving means mounted to the base with a flexible shaft.

The motor 40 can also be mounted on the base 14, and a flexible or movable shaft can couple energy to the weights 42 via gears 94 as shown in FIG. 20. The propulsion unit, as shown in FIG. 20, can be rotated on the payload platform 90 as shown in FIG. 21 to reverse the direction of travel of the payload platform.

The design of the propulsion unit 12 includes a weight guiding means 56 which is provided to guide the counterbalanced weights 42 through an entrance 58 and an exit 60 as shown in FIGS. 2, 3 and 4. The weight guiding means 56 is rigidly attached to the upper surface 16 of the base 14. The means 56 is designed to guide the weights 42 in a non-circular path in relation to the base 14 for a segment of the weight's path. Different path lengths are established in the linear back and forth motion of the weights 42 as they rotate on the carriage 30. When the weights 42 travel from 0–90±20 degrees the base 14 moves slightly backwards. When the weights rotate from 90±20 to 180 degrees, the base moves forward in the desired direction of travel a greater distance than in the previous segment of 0–90±20 degrees and this backward motion is subtracted from the forward motion which is much greater. Therefore, a net forward displacement motion is achieved. The damping means 84 and stop 62 are engaged, as shown in FIGS. 2, 3 and 4, when the carriage 30 engages the forward stop 62. The final two elements that comprise the propulsion unit 12 are a forward stop 62 and a rearward stop 64. These stops, as described infra, are attached to the base 14 and are positioned in relation to the entrance 58 and exit 60 of the weight guiding means 56 as shown in FIGS. 2, 3 and 4.

Figure 21:
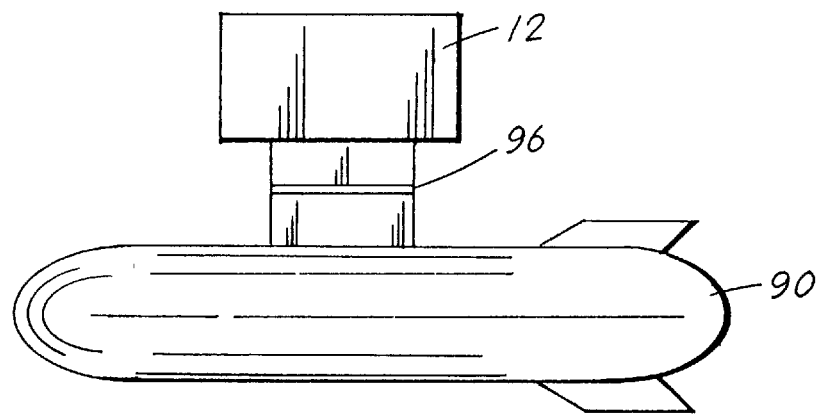
FIG. 21 is a schematic diagram showing the propulsion system with a means for reversing the system's direction of travel.
Figure 22:
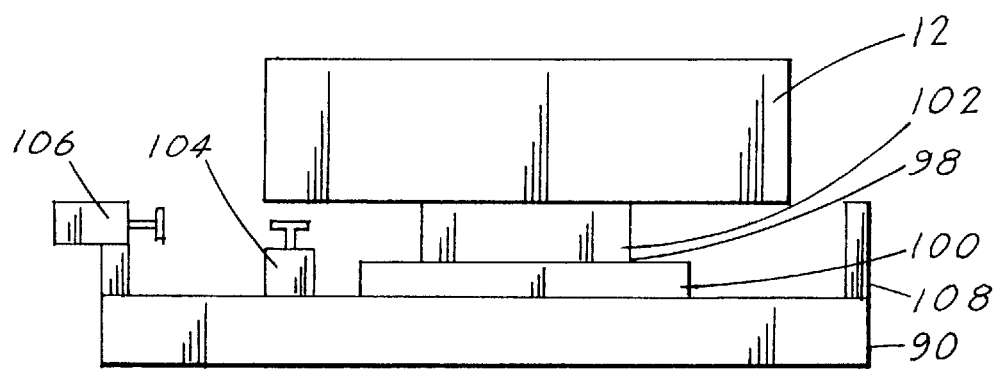
FIG. 22 is a side elevational view of the propulsion unit mounted on a second carriage constraining means which allows the propulsion unit to operate in a Mode II.

The second major element of the propulsion system as shown in FIG. 1, 21 and 22 is the payload platform 90 which can consist of any vehicle to be propelled. As previously stated, the propulsion system is designed to be operated in either a Mode I operating cycle or in a Mode II operating cycle. The Mode I operating cycle as shown in FIGS. 10A, B, C, D, E and F, operates as follows:

A) Initially the propulsion system 10 as shown in FIG. 1 is at a fixed center of mass, the base 14 is at rest, and the weights 42 are located near the entrance 58 of the weight guiding means 56. The system also has zero momentum as shown in FIG. 10A.

Figure 10A:
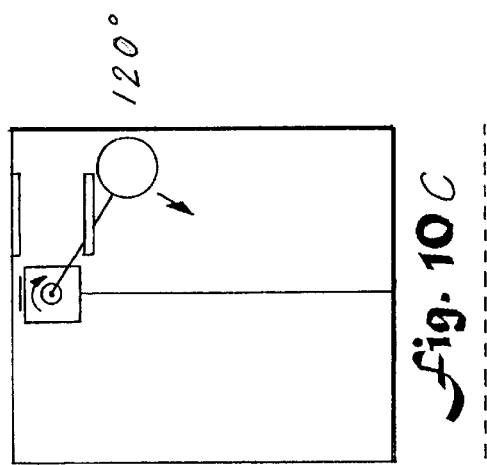
FIG. 10A–10F are schematic diagrams depicting the theory of operation of the propulsion system.
Figure 10B:
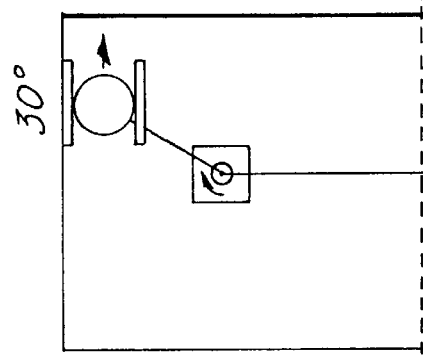

B) The mode I operating cycle commences when the power source 46 energizes the propulsion unit 12 thereby causing the weights 42 to rotate and enter through the entrance 58 of the weight guiding means 56 at 0 degrees as also shown in FIG. 10A. The weights 42 travel in a non-circular path in relation to the base 14, thus allowing the center of mass of the propulsion system 10 to relocate to a new center of mass. The change causes the base 14 to move slightly backwards as the carriage 30 moves forward as the ratio of their masses as shown in FIG. 10B.

Figure 10C:
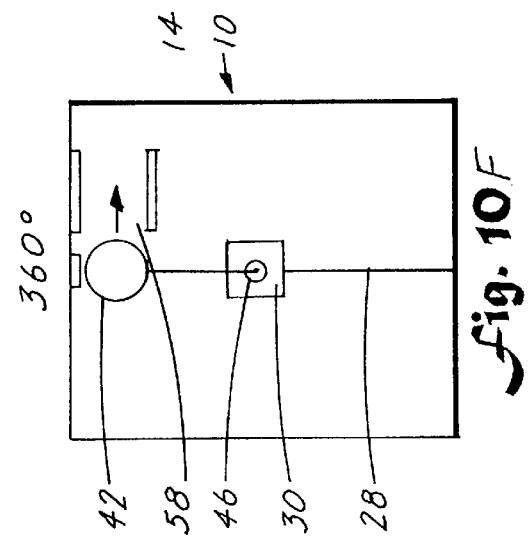
Figure 10D:
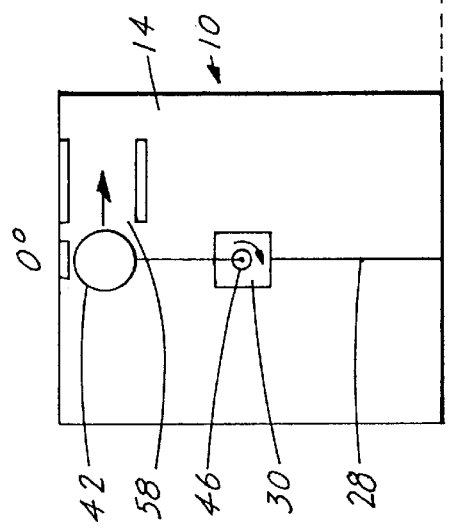
Figure 10E:
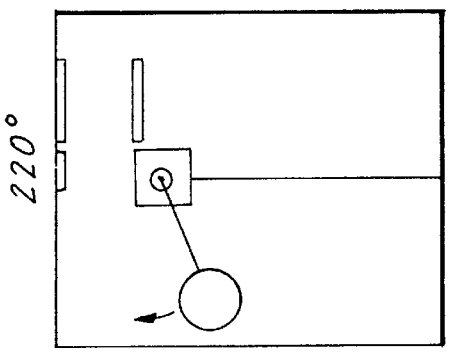
Figure 10F:
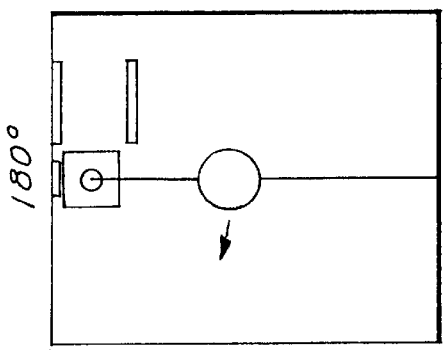

C) The weights 42 subsequently exit from the weight guiding means 56 and the carriage engages the forward stop 62 and rotates from 90±20 to 180 degrees as shown in FIG. 10C. At 90±20 degrees, the carriage to base locking means 80 is engaged. It remains engaged until the weights reach 180 degrees, at which time the locking means is disengaged. This rotation and new weight combination creates a new center of mass which now commences a power phase which causes the payload platform 90 to move forward as a ratio of the base 14 and the carriage 30 to the weights 42 as also shown in FIG. 10C. The forward motion of the payload platform 90 continues until the weights 42 attain their maximum rearward travel which occurs at 180 degrees as shown in FIG. 10D. At this time the forward motion of the payload platform stops, and D) The weights 42 continue to rotate from 180 degrees to 360 degrees as shown in FIG. 10E, at which point in the Mode I operating cycle the carriage 30 is decoupled from the forward stop 62 causing the center of mass of the propulsion system 10 to again relocate to a new center of mass and cause the weights 42 to attain their maximum forward position as shown in FIG. 10F. Now the weights are again in their initial position and commence to once again enter through the entrance 58 of the weight guiding means and repeat the Mode I operating cycle as shown in FIG. 10A.

The weight guiding means 56 is accomplished by various designs. Four such designs are disclosed.

In the first design, as shown in FIGS. 2, 3 and 4, a channel 66 is positioned on the base 14. The channel is dimensioned to slidably receive the weights 42 in a non-circular path in relation to the base while the weights are in the 0–90±20 degrees segment of their rotation as described supra.

Figure 11:
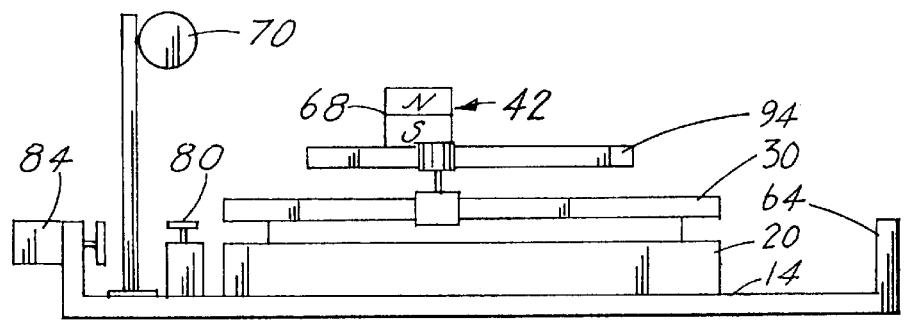
FIG. 11 is a side elevational view showing the magnetic weight guiding means.
Figure 12:
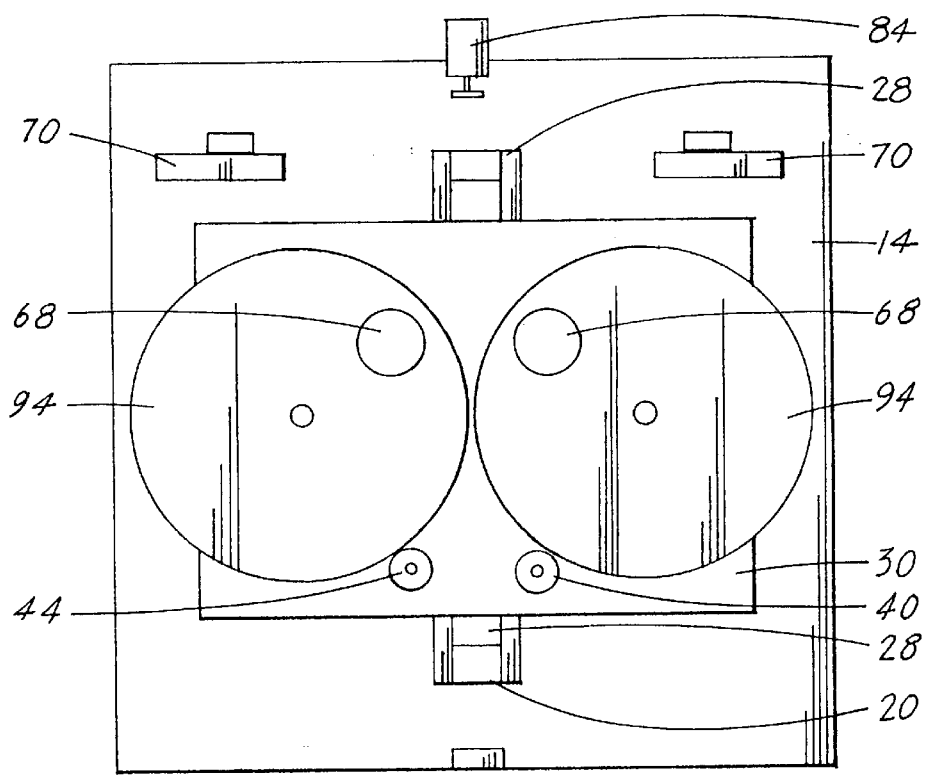
FIG. 12 is a top plan view of FIG. 11.
Figure 13:
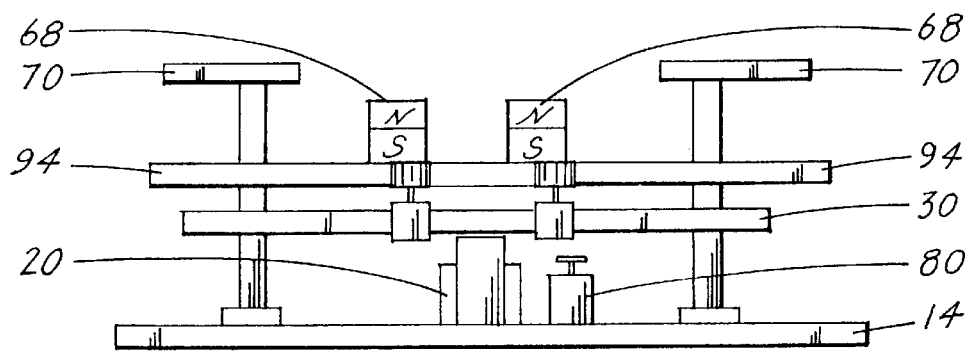
FIG. 13 is an end view of FIG. 11.

In the second design, as shown in FIGS. 11, 12 and 13, at least two magnets 68 are attached to the upper surface of the weights 42. The magnets interact with at least two ferrous bars 70 which are attached to the base 14. The bars 70 guide the weights 42 in a non-circular path in relation to the base while the weights are in the 0–90±20 degrees segment of their rotation.

In the third design, as shown in FIGS. 14, 15 and 16 an electrically conductive plate 72, such as copper or aluminum is mounted to the base 14 and a magnet 74 is attached to each of the weights 42. In this design, the magnets 74 are located adjacent to the conductive plate 72 during a part of their rotation. The rotation of the magnets 74 generates eddy currents in the conductive plate 72 which oppose the magnetic field of the magnets 74 that are attached to the weights 42, which causes the weights 42 to travel in a non-circular path in relation to the base 14.

Figure 17:
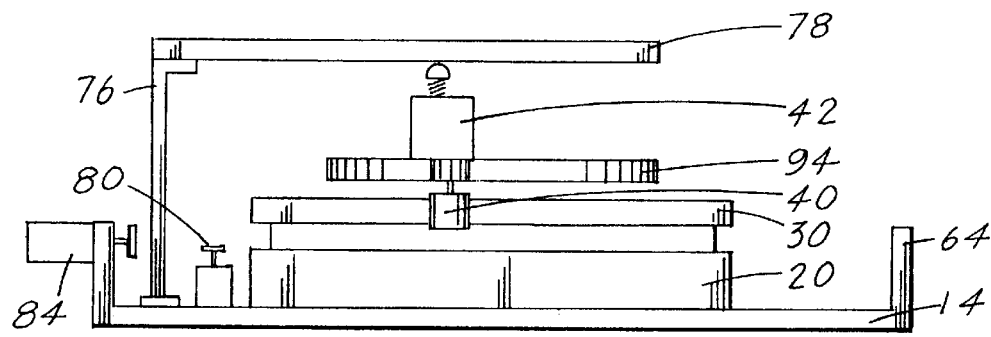
FIG. 17 is a side elevational view of a friction weight guiding means.
Figure 18:
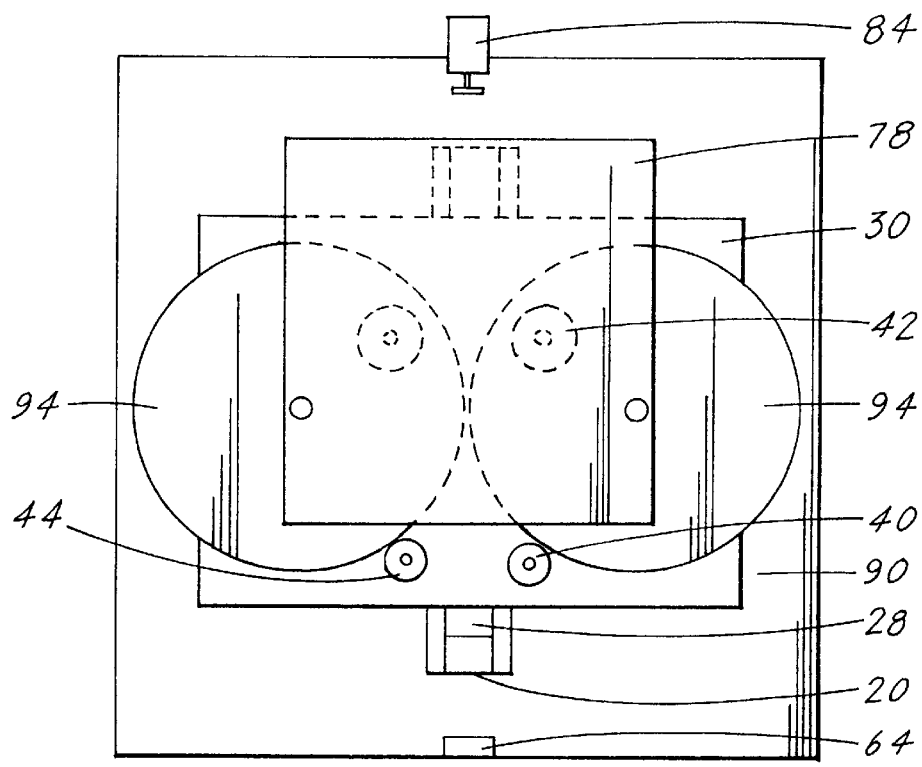
FIG. 18 is a top plan view of FIG. 17.
Figure 19:
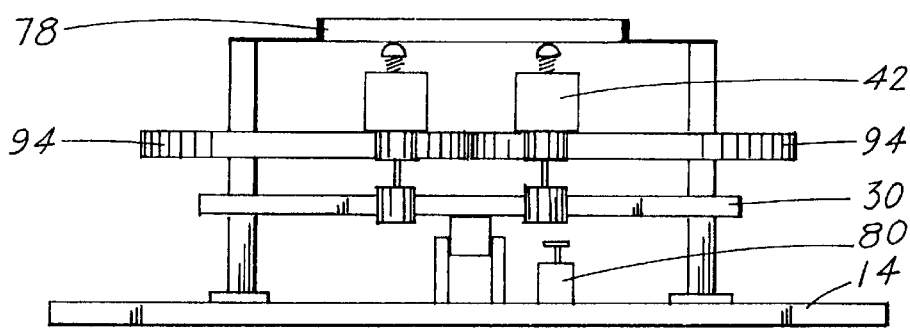
FIG. 19 is an end view of FIG. 17.

In the fourth design, as shown in FIGS. 17, 18 and 19, a weight engaging structure 76 is utilized. This structure is designed to allow the weights 42 to be engaged by friction with the weight engaging plate 78 which is attached to the base 14 from 0–90±20 degrees which causes the weights to travel in a non-circular path in relation to the base 14.

In addition to the major elements described supra, the propulsion system 10 can be designed to include a carriage-to-base locking means 80 and a carriage-to-base damping means 84. The carriage to base locking means 80 as shown in FIGS. 2, 3 and 4 locks the base to the carriage 30 to prevent carriage bounce when the carriage engages the forward stop 62. Multiple propulsion units 12 as shown in FIG. 1 can be connected to the payload platform for greater thrust or to optimize stress on an irregular shaped payload platform.

The best way to understand the Mode II operation is to refer to FIG. 22. The Mode I operating sequence is also used in the propulsion system during Mode II operation. The propulsion unit 12 is mounted on an additional constraining assembly 98 which can be a linear slide whose upper movable section 102 is attached to the propulsion unit 12. The lower stationary section 100 is attached to the payload platform 90. During normal operation of the propulsion unit 12, the unit travels slightly backwards 0–90 degrees and then a greater distance forward 90±20–180 degrees. The slight backwards motion of the unit is not desirable to couple to the payload platform 90, therefore the propulsion unit 12 is mounted on a second constraining assembly 98.

When the propulsion unit 12 goes slightly backwards 0–90±20 degrees during its operation, the propulsion unit 12 goes backwards on the constraining means slide 98 and is thus not coupled to the payload platform 90, other than slight frictional drag on the slide 98. The base also includes a rear stop 98 as shown in FIG. 22.

When the propulsion unit 12 is in its 90±20–180 degrees cycle the propulsion unit 12 travels forward toward a front stop and damping means 106, as shown in FIG. 22 until the propulsion unit 12 contacts the front stop and damping means 106. When the propulsion unit 12 engages the fron stop and damping means 106 the forward momentum of the propulsion unit 12 is coupled to the payload platform 90 and thus causes the payload platform 90 to move forward. This forward motion of the payload platform continues while the propulsion unit 12 again catches up with the forward moving payload platform 90 and engages the external forward stop and damping means 106 again, and the cycle is repeated with the additional increase of velocity of the payload platform 90 in the forward direction.

Each time the propulsion unit 12 engages the forward stop and damping means 106 the payload platform 90 forward velocity is increased a fixed amount. A locking means 104 is engaged at 90±20–180 degrees when it is desired to move the payload platform 90 a fixed amount without the additional increase in velocity during each cycle. This velocity limiting occurs when the payload platform 90 and the propulsion unit 12 are locked together by the locking means 104. The equal and opposite momentums are cancelled when the weights 42 reach 180 degrees and thus the payload platform 90 stops provided that it had no additional forward velocity from operating in Mode II before the payload platform 90 and propulsion unit 12 were operating in Mode I.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:
1. A propulsion system comprising:
A. a propulsion unit comprising:
   a) a base having an upper surface and a lower surface,
   b) a carriage constraining assembly having an upper movable section and a lower stationary section, wherein the stationary section is rigidly attached to the upper surface of said base,
   c) a carriage having an upper surface, a lower surface, a front end and a rear end, wherein the lower surface is rigidly attached to the upper movable section of said carriage constraining assembly,
   d) at least two counterbalanced weights attached to the upper or lower surface of said carriage by an attachment means, wherein said weights are rotated in synchrony and in opposite directions by at least one weight driving means which is attached to said base or said carriage and is coupled to a power source by a coupling means,
   e) means for guiding said weights through an entrance and an exit, wherein said weight guiding means is rigidly attached to the upper surface of said base and guides said weights in a non-circular path in relation to said base wherein different path lengths are established in the forward and reverse directions, wherein when said weights rotate from 0 to 90±20 degrees, said base moves in a direction opposite from the desired direction of travel, and when said weights rotate from 90±20 to 180 degrees, said base moves forward in the desired direction of travel, and
   f) a forward stop and a rearward stop attached to said base and positioned in relation to the exit and entrance of said weight guiding means,
B. a payload platform rigidly attached to said base, wherein said propulsion system is operated in a Mode I operating cycle as follows:
   a) initially said propulsion system is at a fixed center of mass, said base is stopped and said weights are located near the entrance of said weight guiding means,
   b) the Mode I operating cycle commences when said power source energizes said propulsion system causing said weights to rotate and enter through the entrance of said weight guiding means at 0±10 degrees and travel in a non-circular path in relation to said base thereby, allowing the center of mass of said propulsion system to relocate to a new center of mass and cause said base and said weights to move slightly backwards as said carriage moves forward,
   c) said weights exit from said weight guiding means and said carriage engages the forward stop and said weighs rotate from 90±10 to 180 degrees causing the center of mass of said propulsion system to relocate to a new center of mass which commences a power phase which causes said payload platform to move forward as a ratio of said base weight and carriage to said weights, wherein the forward motion of said payload platform continues until said weights attain their maximum rearward travel which occurs at 180 degrees, at which time the forward motion of said payload platform stops, and,
   d) said weights continue to rotate from 180 degrees to 360±10 degrees, wherein at 180 degrees in the Mode I operating cycle, said carriage is decoupled from said forward stop, thus causing the center of mass of said propulsion system to again relocate to a new center of mass and cause said weights to attain their maximum forward position, thereafter said weights are in their initial position and commence to once again enter through the entrance of said weight guiding means and repeat the Mode I operating cycle.

2. The propulsion system as specified in claim 1 wherein said carriage constraining assembly is comprised of a linear slide assembly having an upper movable section and a lower stationary section.

3. The propulsion system as specified in claim 1 wherein said carriage constraining assembly is comprised of a magnetically levitating constraining assembly.

4. The propulsion system as specified in claim 1 wherein said coupling means comprises a movable shaft.

5. The propulsion system as specified in claim 1 wherein said weight driving means comprises an electric motor.

6. The propulsion system as specified in claim 1 wherein said power source comprises a rechargeable battery.

7. The propulsion system as specified in claim 1 wherein said power source comprises a nuclear battery.

8. The propulsion system as specified in claim 1 wherein said power source comprises an array of photovoltaic cells.

9. The propulsion system as specified in claim 1 wherein said power source comprises a fuel-burning combustion engine.

10. The propulsion system as specified in claim 1 wherein said weights are made of a high density material having a specific gravity of at least 0.5 $Gm/Cm^3$ and that can be rotated in either a clockwise or a counterclockwise direction.

11. The propulsion system as specified in claim 1 wherein said means for rotatably attaching at least two counterbalanced weights to the upper surface of said carriage comprises:
   a) a first motor attached to the upper or lower surface of said carriage, and
   b) a second motor attached to the upper or lower surface of said carriage and that is synchronized with said first motor to rotate in an opposite direction from that of said first motor which allows said weights to maintain a relationship which cancels their lateral forces.

12. The propulsion system as specified in claim 1 wherein said means for guiding said weights comprises a channel that is dimensioned and positioned on said base to slidably receive said weights in a non-circular path in relation to said base while said weights are in the 0±10 to 90±20 degree segment of their rotation.

13. The propulsion system as specified in claim 1 wherein said means for guiding said weights comprises at least two magnets that are attached to said weights and which interact with at least two ferrous bars, which are attached to said base and which guide said weights in a non-circular path in relation to said base while said weights are in the 0±10 to 90±20 degree segment of their rotation.

14. The propulsion system as specified in claim 1 wherein said means for guiding said weights comprises an electrically conductive plate mounted to said base and having a magnet attached to each said weight, wherein said magnets are located adjacent to the conductive plate during a part of their rotation, wherein the rotation of the magnets generate eddy currents in said conductive plate which oppose the magnetic field of said magnets attached to the weights which causes said weights to travel in a non-circular path in relation to said base.

15. The propulsion system as specified in claim 1 wherein said means for guiding said weights comprises a weight engaging structure which allows said weights to be engaged by friction with said base from 0±10 to 90±20 degrees which causes said weights to travel in a non-circular path in relation to said base.

16. The propulsion system as specified in claim 1 further comprising a carriage-to-base locking means for locking said carriage to said base to prevent carriage bounce when said carriage engages said forward stop.

17. The propulsion system as specified in claim 16 wherein said carriage-to-base locking means comprises an electrical solenoid that is activated by said power source.

18. The propulsion system as specified in claim 1 further comprising a carriage-to-base damping means which is activated prior to when said carriage engages said forward stop.

19. The propulsion system as specified in claim 1 further comprising:
   a) a second carriage constraining assembly having an upper movable section and a lower stationary section, wherein the upper movable section is rigidly attached to the lower surface of said base and the lower stationary section is attached to said payload platform.
   b) a locking means for locking and unlocking said base to said payload platform during the rotation of said weights, thus enabling said payload platform to decouple during the 0±10 degrees to 90±20 degrees rotation of said weights, thereby eliminating the coupling of the rearward motion of said base to said payload platform in either the Mode I or Mode II operating cycle,
   c) an external front stop which includes a damping and an external rear stop attached to said payload platform and positioned in alignment with said forward and rearward stops, wherein by the addition of said second carriage constraining assembly and said external front and rear stops, said propulsion system is operated in a Mode II operating cycle as follows:
      (1) initially said propulsion system is at a fixed center of mass, said base is stopped and said weights are located near the entrance of said weight guiding means,
      (2) the Mode II operating cycle commences when said power source energizes said propulsion system causing said weights to rotate and enter through the entrance of said weight guiding means and travel in a non-circular path, in relation to said base thereby, allowing the center of mass of said propulsion system to relocate to a new center of mass and cause said base to move slightly backwards, and
      (3) said weights exit from said weight guiding means and rotate from 90±20 to 180 degrees thereby, allowing the center of mass of said propulsion system to relocate to a new center of mass which commences a power phase which causes said base to move and interface with said forward stop and to move forward as a ratio of said base and carriage to said weights, wherein the forward motion of said base continues until said weights attain their maximum rearward travel which occurs at 180 degrees, at which time the forward motion of said base stops and said weights continue to rotate from 180 degrees to 360±10 degrees, at which point said carriage constraining assembly which is operating in Mode I is decoupled from said forward stop, thus causing the center of mass of said propulsion system to again relocate to a new center of mass and cause said weights to attain their maximum forward position, thereafter said weights return to their initial position and commence to once again enter through the entrance of said weight guiding means and repeat the Mode I operating cycle, as the base travels forward incrementally on said second carriage constraining assembly mounted between the base and the payload platform, when said base engages said forward external stop and said damping means the next operating cycle causes the payload platform to move forward because the base is in contact with the front stop on the payload platform, thus the forward motion of the payload platform is determined by the ratio of the weights to the combined weight of the payload platform, the base and the carriage, the forward motion of the payload platform continues, said base however, moves backward on said second constraining means on said payload platform until said propulsion unit cycles again causing said base to move forward to engage the front stop on said payload platform, thus each subsequent engagement of said base with the front stop causes said payload platform to gain an additional increment of velocity in the forward direction wherein the velocity increases are additive.

20. The propulsion system as specified in claim 1 further comprising a means for rotating said propulsion system 180-degrees to allow said system and payload to slow down, change or reverse its direction of travel.

21. The propulsion system as specified in claim 1 wherein multiple propulsion systems are attached to said payload platform.

* * * * *